United States Patent

[11] 3,614,379

[72] Inventor Jacques Troton
Fraisse, France
[21] Appl. No. 869,899
[22] Filed Oct. 27, 1969
[45] Patented Oct. 19, 1971
[73] Assignee Compaign Des Ateliers et Forges de la Loire
Paris, France
[32] Priority Oct. 28, 1968
[33] France
[31] 171,178

[54] METHOD OF MANUFACTURING ALUMINUM BRONZE-STAINLESS STEEL BIMETALLIC PLATES
7 Claims, No Drawings

[52] U.S. Cl. .................................................. 219/137,
219/118, 29/196.3
[51] Int. Cl. ....................................................... B23k 9/00
[50] Field of Search............................................. 219/137,
118, 76; 29/197, 196.1, 195.5, 196.3

[56] References Cited
UNITED STATES PATENTS

| | | | |
|---|---|---|---|
| 2,113,667 | 4/1938 | Swift ............................ | 219/137 X |
| 2,158,799 | 5/1939 | Larson ......................... | 214/76 |
| 2,669,640 | 2/1954 | Outcalt et al. ................ | 219/76 |
| 2,787,699 | 4/1957 | Jessen .......................... | 219/137 |
| 2,916,602 | 12/1959 | Eagleston..................... | 219/76 |
| 3,393,445 | 7/1968 | Ulam............................ | 219/196.1 |

FOREIGN PATENTS

| | | | |
|---|---|---|---|
| 1,013,401 | 12/1965 | Great Britain................ | 219/76 |

OTHER REFERENCES

"Hard Facing with Inert & Gas Arc Welding" The Welding Journal, K. H. Koopman, January 1949, pages 46– 52
The Welding Handbook, 1942, pages 882, 883

Primary Examiner—J. V. Truhe
Assistant Examiner—George A. Montanye
Attorney—Wenderoth, Lind & Ponack

ABSTRACT: A method of manufacturing bimetallic plates of aluminum bronze and stainless steel by loading by means of blow torch on a baseplate of austenitic or austeno-ferritic steel an intermediate layer of austeno-ferritic stainless steel of adequate composition to yield a ferrite content ranging from about 10 percent to about 20 percent, and loading said intermediate layer with aluminum bronze by arc-welding.

METHOD OF MANUFACTURING ALUMINUM BRONZE-STAINLESS STEEL BIMETALLIC PLATES

The present invention relates to a method of manufacturing bimetallic plates of aluminum bronze and stainless steel, by loading with deposited metal by means of blow torch. This invention is also concerned with bimetallic plates obtained by carrying out this method, notable those intended for use as tubular plates of heat transfer devices and the like.

Loading austenitic and austeno-ferritic stainless steels by depositing aluminum bronze by arc-welding is attended by the serious drawback of producing cracks under the bead in the base steel.

This cracking can be avoided by resorting to the method of this invention which permits of producing sound, highly reliable bimetallic plates, suitable notably for constructing tubular plates for heating transfer devices and the like (as currently used in case corrosion by sea water is to be feared).

The method of this invention consists in obtaining a bimetallic plate from a baseplate of austentic or austeno-ferritic steel, by loading this baseplate by arc-welding with an intermediate layer of austeno-ferretic stainless steel of adequate composition to yield a ferrite content ranging from about 10 percent to about 20 percent, then depositing aluminum bronze on said intermediate layer, also by arc-welding.

According to a specific but nonlimiting feature characterizing this invention, the intermediate layer of stainless austeno-ferritic steel is of the grade containing from 17 percent to 22 percent Cr, 8 percent to 12 percent Ni, and 2 percent to 4 percent Mo.

According to another feature characterizing this invention the intermediate layer consists of a steel grade already manufactured by the applicant and assaying as follows:

C=0.05%
Si=0.5%
Mn=0.5%
Cr=20.0%
Ni=8.0%
Mo=2.5%
Cu=1.5%

All known and conventional arc-welding processes, whether manual or automatic, may be used for depositing the above-defined intermediate layer and loading same with aluminum bronze.

An advantageous application of this manufacturing method is notably the construction of tubular bimetallic plates of heat transfer devices and the like.

Plates constructed according to the teachings of this invention are characterized by the following advantageous features in comparison with those obtained through other known methods:

a sound alloy is definitely warranted,
a higher mechanical strength is obtained, as well as
an improved corrosion-resisting structure.

In order to afford a clearer understanding of this invention, a typical form of embodiment thereof will now be described by way of example in the case of the construction of four tubular plates for heat transfer devices having a diameter of 994 millimeters and utilizing sea water as a heat carrier medium.

For each plate the base metal is an austentic stainless steel assaying as follows: Cr=18 percent, Ni=12 percent and C<0.030 percent, having a thickness of 53 mm. An intermediate layer of austeno-ferretic stainless steel assaying as follows: Cr=20 percent, Ni=8 percent, Mo=2.5 percent, Cu=1.5 percent and C<0.050 percent is loaded on the base layer or plate by arc-welding.

Then, a 15 mm. thick layer of aluminum bronze is deposited thereon by arc-welding.

These plates are subsequently perforated by drilling therethrough 1,021 holes having a diameter of three-quarters of an inch, without observing any crack formation, and bimetallic tubes of the same grade as the baseplates are fitted through these holes. The resulting assembly is both homogenous and economical.

What is claimed is:

1. A method of manufacturing bimetallic plates of austenitic stainless steel and aluminum bronze, comprising the steps of hard-facing by means of arc-welding on a baseplate of austenitic stainless steel an intermediate layer of austeno-ferretic stainless steel of suitable grade to obtain in said intermediate layer a ferrite content ranging from about 10 percent to about 20 percent, and subsequently hard-facing said intermediate layer with aluminum bronze by arc-welding.

2. A method of manufacturing bimetallic plates of austenitic stainless steel and aluminum bronze, comprising the steps of hard-facing by means of arc-welding on a baseplate of austeno-ferritic stainless steel an intermediate layer of austeno-ferritic stainless steel of suitable grade to obtain in said intermediate layer a ferrite content ranging from about 10 percent to about 20 percent, and subsequently hard-facing said intermediate layer with aluminum bronze by arc-welding.

3. A method of manufacturing bimetallic plates of austenitic stainless steel and aluminum bronze, comprising the steps of hard-facing by means of arc-welding on a baseplate of austenitic stainless steel in an intermediate layer of austeno-ferritic stainless steel having the following composition: Cr=17 percent to 22 percent, Ni=8 percent to 12 percent, and Mo=2 percent to 4 percent and subsequently hard-facing said intermediate layer with aluminum bronze by arc-welding.

4. A method of manufacturing bimetallic plates of austenitic stainless steel and aluminum bronze, comprising the steps of hard-facing by means of arc-welding on a baseplate of austeno-ferretic stainless steel an intermediate layer of austeno-ferritic stainless steel having the following composition: CR=17 percent to 22 percent, Ni=8 percent to 12 percent and Mo=2 percent to 4 percent, and subsequently hard-facing said intermediate layer with aluminum bronze by arc-welding.

5. A method of manufacturing bimetallic plates of austenitic stainless steel and aluminum bronze, comprising the steps of hard-facing by means of arc-welding on a baseplate of austenitic stainless steel an intermediate layer of austeno-ferritic stainless steel having the following composition:

C=0.05%
Si=0.5%
Mn=0.5%
Cr=20.0%
Ni=8.0%
Mo=2.5%
Cu=1.5% and subsequently hard-facing said intermediate layer with aluminum bronze by arc-welding.

6. A method of manufacturing bimetallic plates of austenitic stainless steel and aluminum bronze, comprising the steps of hard-facing by means of arc-welding on a baseplate of austeno-ferritic stainless steel an intermediate layer of austeno-ferritic stainless steel having the following composition:

C=0.05%
Si=0.5%
Mn=0.5%
Cr=20.0%
Ni=8.0%
Mo=2.5%
Cu=1.5%, and subsequently hard-facing said intermediate layer with aluminum bronze by arc-welding.

7. Bimetallic plates of a heat transfer device prepared by the method of claim 8.